UNITED STATES PATENT OFFICE.

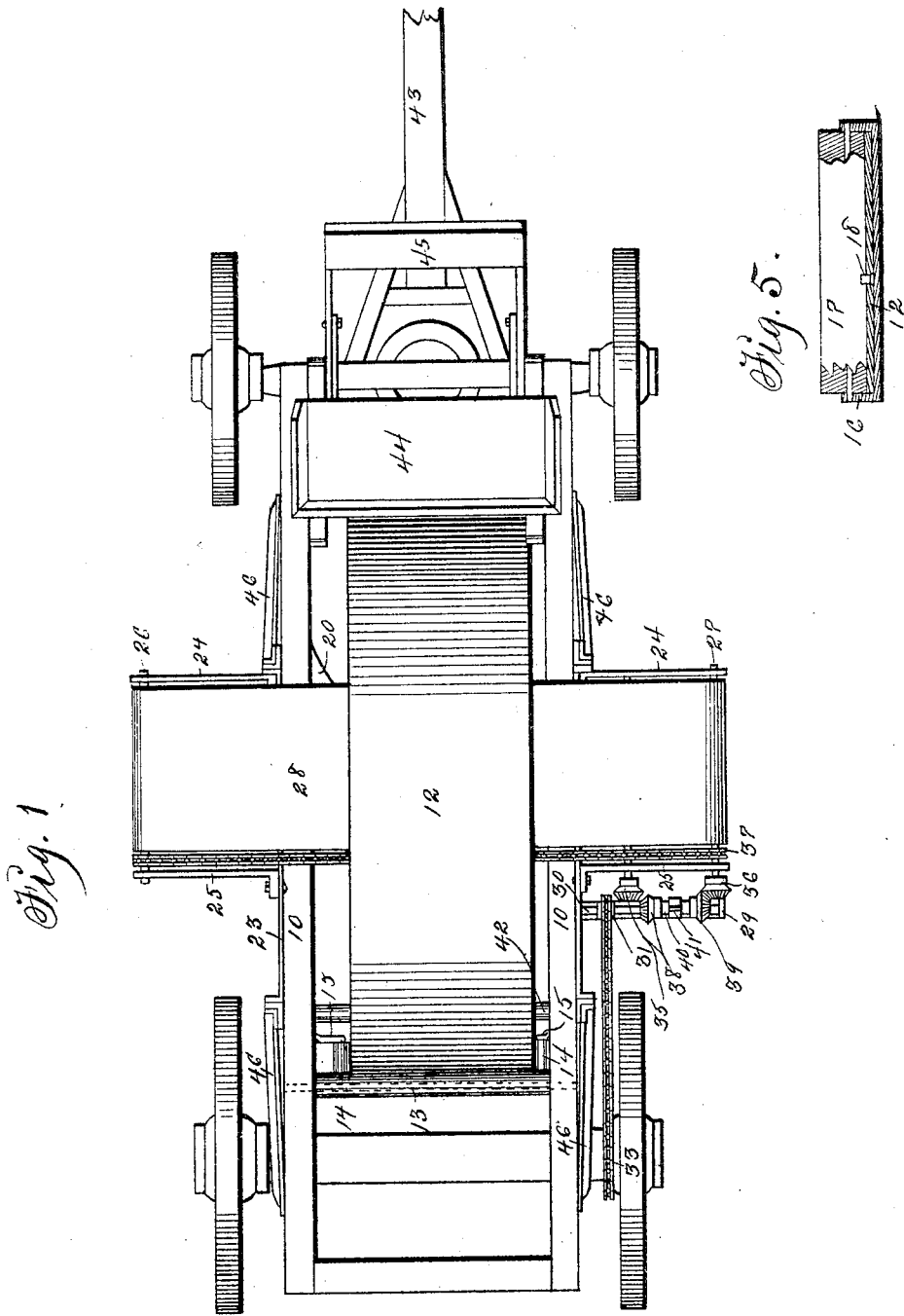

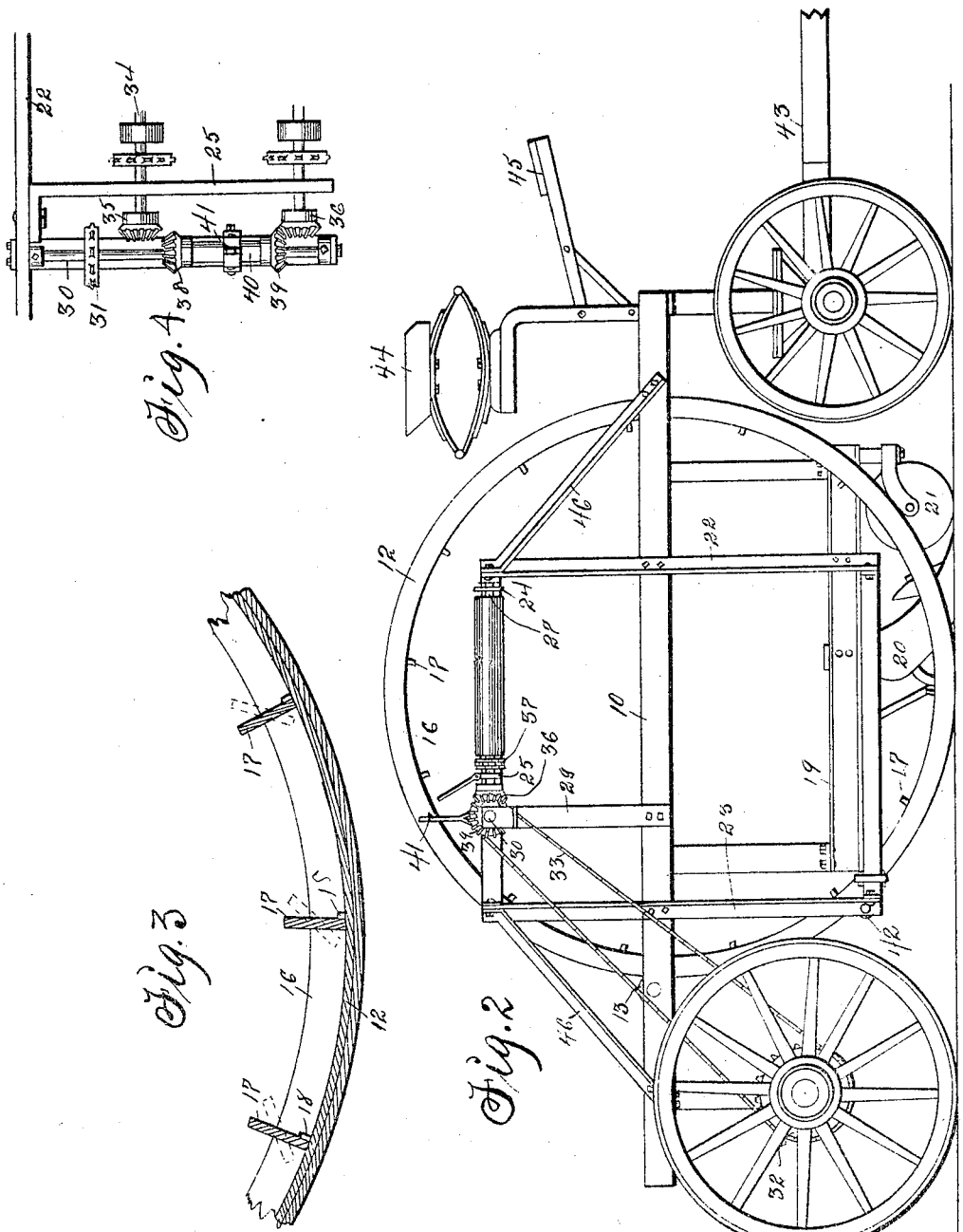

GEORGE M. KEPNER AND CYRUS M. SMITH, OF FORT DODGE, IOWA.

ROAD GRADER AND EXCAVATOR.

No. 798,586.     Specification of Letters Patent.     Patented Aug. 29, 1905.

Application filed April 26, 1905. Serial No. 258,134.

*To all whom it may concern:*

Be it known that we, GEORGE M. KEPNER and CYRUS M. SMITH, citizens of the United States, residing at Fort Dodge, in the county of Webster and State of Iowa, have invented a new and useful Road Grader and Excavator, of which the following is a specification.

Our object is to provide a road grader and excavator adapted to loosen ground as it is advanced and to elevate the loose ground into a wagon or deposit it at its side, as required, in moving ground from the ditches and sides of the road toward its center.

A further object is to provide means for reversing the movement of an endless carrier, as required, to deliver the loose and elevated ground to either side of the machine and line of advance at the pleasure of the operator.

A further object is to diminish the friction of the means employed for elevating the loose ground and to reduce the maximum of power heretofore required for loosening and elevating ground.

Our invention consists in the construction, arrangement, and combination of operative elements and subcombinations with a tractable carriage, as hereinafter set forth, pointed out in our claims, and illustrated in the accompanying drawings, in which—

Figure 1 is a top view, and Fig. 2 a side elevation, of the machine that show the positions of all the operative parts relative to each other and the tractable carriage. Fig. 3 is a sectional view of a segment of the wheel that elevates the ground. Fig. 4 is a detail view of mechanism for reversing the movement of the side-delivery endless carrier. Fig. 5 is a transverse section of the elevating-wheel that takes up loose ground and delivers it on the side-delivery endless carrier.

The numeral 10 designates an oblong frame of a four-wheeled carriage that must be long enough to allow a large wheel 12 to be placed within the frame to rest upon the ground and its upper half to extend above the frame, as shown in Fig. 1. A roller 13 is journaled to the parallel sides of the frame and in rear of the wheel 12 in such a manner that when the carriage is advanced the roller will press against the wheel and impart a rolling motion to the wheel. Rollers 14 on bearers 15, fixed to the parallel side of the frame 10, as shown in Fig. 2, or in any suitable way, engage the flanges 16 at the edges of the wheel 12 to keep it parallel with the frame and the line of advance when the machine is in operation. To the flanges 16 are pivoted a plurality of deflectors 17, that will be retained stationary, as required, to retain ground thrown between the flanges 16 by a plow to be carried up to the top portion of the wheel and then dumped upon an endless carrier that extends horizontally through the wheel. Stops 18 are fixed in the wheel to project inward to engage the deflectors 17, as required, to keep them stationary relative to the wheel as they are carried upward as the wheel rolls forward.

A frame 19 is fixed to one of the sides of the carriage-frame, and a plow 20 and a wheel-colter 21, fixed to the frame in any suitable way, as required, for loosening ground when the machine is advanced.

Frames 22 and 23 are fixed to the parallel sides and central portion of the carriage-frame to extend upward and downward, and frames 24 and 25 are fixed to their outsides to project horizontally, and rollers 26 and 27, journaled to their outer ends to support an endless carrier 28, mounted on said rollers.

An auxiliary frame 29 for supporting gearing and reversing mechanism is fixed to the carriage-frame 10 in parallel position with the frame 24, and a shaft 30, mounted thereon, and a sprocket-wheel 31, fixed thereto and connected with a sprocket-wheel 32, fixed on the rear carriage-axle, and the two sprocket-wheels are connected by a chain 33, as required, to impart motion from the axle to the shaft 30. A shaft 34 is mounted in the frame 24 and has a fixed bevel gear-wheel 35 in alinement with corresponding wheels 36 on the ends of the rollers 26 and 27, and a chain 37 connects the three sprockets, as required, to simultaneously impart motion to the two rollers 26 and 27 and the shaft 34.

Bevel gear-wheels 38 and 39 are fixed on a sleeve 40 on the shaft 30, and a lever 41, connected with the sleeve, as shown in Fig. 4, or in any suitable way to facilitate moving the sleeve, as required, for reversing the motion of the chain 37 and endless carrier 28.

A roller 42 is mounted in the lower rear corners of the frames 22 and 23 to engage the periphery of the large elevator-wheel 12, as required, to aid in rolling the wheel forward as the carriage is advanced.

A pole 43 is connected with the front carriage-axle for hitching horses thereto, and a driver's seat 44 and foot-rest 45 are fixed on the front end of the carriage-frame 10.

Braces 46 are fixed to the sides and end portions of the frame 10 and the frames 22 and 23.

Having thus set forth the purposes of our invention and the construction, function, and arrangement and combination of all the parts, the practical operation and utility of the machine will be obvious to persons familiar with the art to which it pertains.

What we claim as new, and desire to secure by Letters Patent, is—

1. In a road-grader, a carriage-frame upon four wheels and a wheel for elevating ground placed loosely within the frame to roll upon the ground and to elevate loose ground as the carriage is advanced.

2. In a road-grader, a carriage-frame upon four wheels and a wheel for elevating ground placed within the frame to roll upon the ground and to elevate loose ground as the carriage is advanced and a plow connected with the carriage-frame for loosening ground.

3. In a road-grader, a carriage-frame upon four wheels and a wheel for elevating ground placed within the frame to roll upon the ground and to elevate loose ground as the carriage is advanced, a plow connected with the carriage-frame for loosening ground and a roller journaled to the rear end portion of the carriage-frame to engage the elevator-wheel to propel it when the carriage is advanced.

4. In a road-grader, a carriage-frame upon four wheels and a wheel for elevating ground placed within the frame to roll upon the ground and to elevate loose ground as the carriage is advanced, a plow connected with the carriage-frame for loosening ground and a roller journaled to the rear end portion of the carriage-frame to engage the elevator-wheel to propel it when the carriage is advanced and means for retaining the elevator-wheel in parallel position with the sides of the carriage-frame when the carriage is in motion.

5. In a road-grader and elevator, a carriage having an oblong frame and an elevator-wheel loose within the frame and projected about half-way above the frame, means connected with the rear portion of the frame to engage the elevator-wheel to propel it on the ground when the carriage is moved forward, frames fixed to the parallel sides of the carriage-frame to extend horizontally, rollers mounted in their ends and an endless carrier on the rollers and extended horizontally through the top portion of the elevator-wheel, to operate in the manner set forth for the purposes stated.

6. In a road-grader and elevator, a carriage having an oblong frame and an elevator-wheel loose within the frame and projected about half-way above the frame, means connected with the rear portion of the frame to engage the elevator-wheel to propel it on the ground when the carriage is moved forward, frames fixed to the parallel sides of the carriage-frame to extend horizontally to rollers mounted on their ends, an endless carrier on the rollers and extended horizontally through the top portion of the elevator-wheel, and means to operate said rollers in the manner set forth for the purposes stated.

7. In a road-grader and elevator, a carriage having an oblong frame and an elevator-wheel loose within the frame and projected about half-way above the frame, means connected with the rear portion of the frame to engage the elevator-wheel to propel it on the ground when the carriage is moved forward, frames fixed to the parallel sides of the carriage-frame to extend horizontally to rollers mounted on their ends, an endless carrier on the rollers and extended horizontally through the top portion of the elevator-wheel, means to operate said rollers and means to reverse the motion of the endless carrier, arranged and combined in the manner set forth for the purposes stated.

8. In a road-grader and elevator, a carriage having an oblong frame and an elevator-wheel loose within the frame and projected about half-way above the frame, means connected with the rear portion of the frame to engage the elevator-wheel to propel it on the ground when the carriage is moved forward, frames fixed to the parallel sides of the carriage-frame to extend horizontally to rollers mounted on their ends, an endless carrier on the rollers and extended horizontally through the top portion of the elevator-wheel, an auxiliary frame fixed to the carriage-frame to extend outward at the side of one of the roller-bearing frames and a shaft mounted in its top, a sprocket-wheel on the inner end portion of said shaft, a sprocket-wheel on the rear carriage-axle and the two sprocket-wheels connected by a chain, a sprocket-wheel on each roller at the ends of the carrier connected by a chain and one of said rollers connected with the shaft on the auxiliary frame, arranged and combined to operate in the manner set forth for the purposes stated.

9. A road-grader and elevator comprising a carriage having an oblong frame and an elevator-wheel loose within the frame and projected about half-way above the frame, means connected with the rear portion of the frame to engage the elevator-wheel to propel it on the ground when the carriage is moved forward, frames fixed to the parallel sides of the carriage-frame to extend horizontally to rollers mounted on their ends, an endless carrier on the rollers and extended horizontally through the top portion of the elevator-wheel, an auxiliary frame fixed to the carriage-frame to extend outward at the side of one of the roller-bearing frames and a shaft mounted in its top, a sprocket-wheel on the inner end portion of said shaft, a sprocket-wheel on the rear carriage-axle and the two sprocket-wheels connected by a chain, a sprocket-wheel on each roller at the ends of the carrier connected by a chain and one of said rollers connected with the shaft on the auxiliary frames, a sleeve on the shaft and a bevel gear-wheel on each end of the sleeve and a third roller for moving the endless carrier provided with a sprocket-wheel and a bevel gear-wheel and means for moving the sleeve to reverse the motion of the carrier, all arranged and combined to operate in the manner set forth for the purposes stated.

GEORGE M. KEPNER.
CYRUS M. SMITH.

Witnesses;
P. W. SMITH,
ROY C. CRAWFORD.